United States Patent
Gandhi et al.

(10) Patent No.: US 7,103,159 B2
(45) Date of Patent: Sep. 5, 2006

(54) OFF-HOOK NOTIFIER

(75) Inventors: Shailesh B. Gandhi, Boca Raton, FL (US); Pradeep P. Mansey, Coral Springs, FL (US); Anilkumar B. Patel, West Palm Beach, FL (US)

(73) Assignee: International Business Machines Corporation, Armonk, NY (US)

(*) Notice: Subject to any disclaimer, the term of this patent is extended or adjusted under 35 U.S.C. 154(b) by 41 days.

(21) Appl. No.: 10/730,846

(22) Filed: Dec. 9, 2003

(65) Prior Publication Data

US 2005/0123126 A1 Jun. 9, 2005

(51) Int. Cl.
*H04M 11/00* (2006.01)

(52) U.S. Cl. ............... 379/93.09; 379/93.28; 379/102.01; 379/102.04; 379/93.35; 379/106.08; 375/223

(58) Field of Classification Search ........ 379/377–386, 379/207.02–207.08, 102.01–102.04, 93.35, 379/106.08; 375/222–223
See application file for complete search history.

(56) References Cited

U.S. PATENT DOCUMENTS

| | | | |
|---|---|---|---|
| 5,115,462 A * | 5/1992 | Kennedy et al. ......... 379/29.05 |
| 6,233,330 B1 | 5/2001 | McClure et al. | |
| 6,453,017 B1 * | 9/2002 | Cannon et al. .......... 379/29.07 |
| 6,567,520 B1 | 5/2003 | Murphy et al. | |
| 2002/0076020 A1 * | 6/2002 | Azami et al. ............ 379/142.1 |
| 2002/0163999 A1 * | 11/2002 | Farris et al. ............. 379/88.02 |
| 2003/0021393 A1 * | 1/2003 | Caharel et al. ............ 379/67.1 |
| 2003/0128821 A1 * | 7/2003 | Luneau et al. ........... 379/88.21 |
| 2003/0206563 A1 * | 11/2003 | Lazarus et al. ............. 370/526 |

FOREIGN PATENT DOCUMENTS

EP    1115264    7/2001

* cited by examiner

*Primary Examiner*—Fan Tsang
*Assistant Examiner*—Ramnandan Singh
(74) *Attorney, Agent, or Firm*—Akerman Senterfitt

(57) ABSTRACT

A method for handling an off-hook event can include the step of detecting an off-hook event with a modem communicatively linked to a circuit loop in which the off-hook event occurs. The detection can be based upon audible information conveyed within the circuit loop. At least one programmatic action can be initiated with a computing device communicatively linked to the modem. An off-hook notification can be conveyed as a result of the programmatic action.

21 Claims, 3 Drawing Sheets

OFF-HOOK NOTIFIER

BACKGROUND

1. Field of the Invention

The present invention relates to the field of telecommunications and, more particularly, to a detection and a notification of an off-hook telephone event.

2. Description of the Related Art

Telephones are often left off the hook by mistake, thereby preventing incoming calls from being received. Even though telephony companies monitor for off-hook telephones and responsively convey an off-hook tone to unattended telephones, a telephone user can remain unaware of the off-hook event. For example, the volume of the telephone receiver can be relatively low so that the off-hook tone is not heard. Another reason the off-hook tone can remain unheard is that the telephone user could no longer be proximately located to the off-hook telephone. Conventional devices do not provide an adequate solution to the detection and notification of off-hook events.

Prior art on/off-hook detection and notification devices involve the monitoring of the voltage differential existing within a circuit loop. The voltage differential (between the "tip" and "ring" telephone wires) is generally equal to the central office (telephony switch) battery voltage less some small amount attributable to resistance losses, which is typically in the range of −40 to 47 volts Direct Current (DC). When an off-hook condition occurs, a current is drawn from the circuit loop resulting in a voltage drop in the circuit loop of approximately 10 to 15 volts DC. Additional off-hook telephony devices in the circuit loop can result in an additional voltage drop of typically 1 to 3 volts DC per additional device.

Monitoring for voltage differential to detect off-hook events at the central office (telephony switch) involves the telephony company implementing customized hardware and software solutions. When a telephone company or value-added service provider provides additional off-hook notification services via Fax or email (as indicated in U.S. Pat. No. 6,453,017 B1), these services can entail a monthly surcharge that the majority of users may be unwilling to pay. Further, the notification services can be limited to areas serviced by particular providers using particular telephony equipment.

Monitoring for voltage differential to detect off-hook events using customer premise equipment (CPE) can require an investment in expensive hardware designed specifically for the detection of off-hook events based on voltage drops. Few users are willing to incur the expense of dedicated CPE to detect and/or provide notice of off-hook events. Consequently, a method of monitoring and notifying users of off-hook events that users can implement without purchasing dedicated CPE is needed.

SUMMARY OF THE INVENTION

The present invention provides a method, a system, and an apparatus for notifying users that a telephone has not been hung up properly or is in an off-hook state. More specifically, an off-hook information tone can be detected by a modem connected to a telephone circuit. A computer communicatively linked to the modem can provide a notification to a household resident responsive to the detection of the off-line event. In one embodiment, the computer can play a speech message through speakers within the home that are linked to the computer. In another embodiment, the computer can convey an off-hook notification via email, instant messaging, Voice over Internet Protocol (VOIP) voice messaging, fax, wireless communications, and the like.

One aspect of the present invention can include a method for handling an off-hook event. The method can include the step of detecting an off-hook event with a modem communicatively linked to a circuit loop in which the off-hook event occurs. The detection can be based upon communication signals conveyed within the circuit loop. At least one programmatic action can be initiated with a computing device communicatively linked to the modem. An off-hook notification can be conveyed as a result of the programmatic action. The off-hook notification can include a speech message, an indicative tune, and/or an electronic message. In one embodiment, the speech message can be based upon a previously recorded message; while in another embodiment, the speech message can include synthetically generated speech. In a particular embodiment, the conveyance of the off-hook notification can occur by audibly playing the notification using speakers connected to the computing device. In an alternate embodiment, the off-hook notification can be conveyed across the Internet to a remote computer. In still another embodiment, the notification can be conveyed across a wireless network to a mobile device.

The invention can detect the off-hook event using a variety of techniques. In one embodiment, an audible information tone can be received from a central telephony office that indicates a telephone is off the hook. In another embodiment, the off-hook event can be determined locally by periodically examining the communication signals within the circuit loop. In such an embodiment, a determination can be made as to whether a dial tone is present. If so, no off-hook event has occurred. If there is no dial tone, the communication signals within the circuit loop can be checked for communication activity, such as speech activity or a data transfer activity. If no communication activity is detected for a previously determined time-out period, a determination can be made that an off-hook event has occurred.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
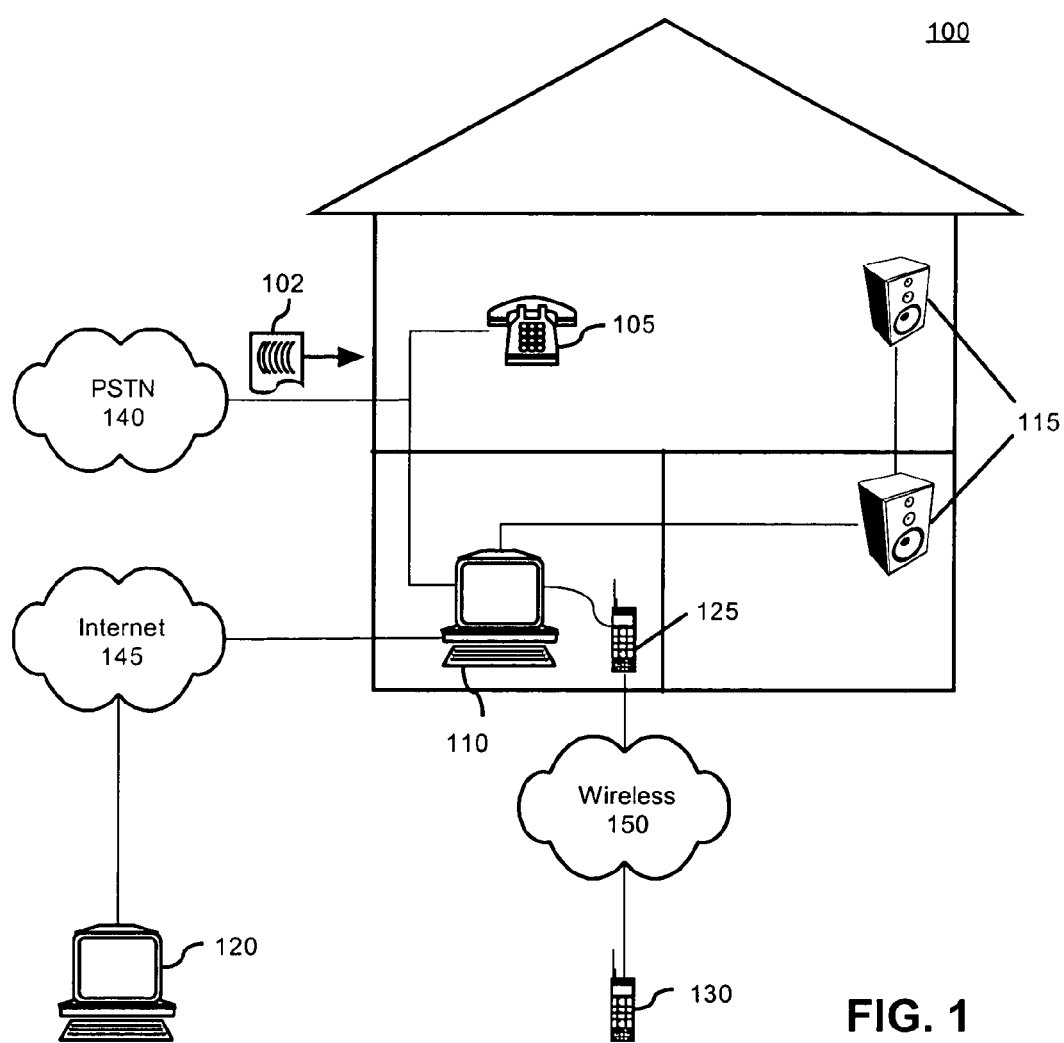
FIG. 1 is a schematic diagram illustrating an exemplary system for detecting off-hook events and notifying a telephone owner of the same in accordance with the inventive arrangements disclosed herein.

FIG. 1 is a schematic diagram illustrating an exemplary system 100 for detecting off-hook events and notifying a telephone owner of the same in accordance with the inventive arrangements disclosed herein. The system 100 can include a telephone device 105 and a computing device 110 that are connected to the same circuit loop or phone line of a public switched telephone network (PSTN) 140. The PSTN 140 can transmit an audible tone 102 whenever an off-hook event is detected, where the audible tone 102 indicates that the telephone device 105 is not being utilized and is not hung up. The audible tone 102 can be a distinctive beeping sound that is played through the speaker of the off-hook headset to draw attention to the off-hook telephone device 105.

The computing device 110 can utilize a modem to detect the audible tone 102. In one embodiment, the modem can be automatically activated whenever a telephone device 105 is off-hook and automatically deactivated whenever the telephone device 105 is hung up. When activated, the computing device 110 can monitor the phone line for the audible tone 102 indicative of an off-hook event.

In another embodiment, the modem need not be constantly active when the telephone device 105 is off-hook. In such an embodiment, the modem can be used to intermittently monitor the phone line at previously established time intervals for the audible tone 102. In yet another embodiment, an inline filter or detection device can be added to the phone line that is automatically triggered whenever audible tone 102 is present. Once triggered, the inline detection device can responsively activate the modem. The newly activated modem can then sample the phone line, so that the computing device 110 can confirm that the audible tone 102 is present, which indicates the telephone device 105 is off-hook.

In a particular embodiment, the computing device 110 can determine the off-hook event without relying upon an off-hook audible tone 102. In such an embodiment, the computing device 110 can periodically monitor the circuit loop to which the modem is connected for a dial tone, which can indicate that all telephony devices connected to the circuit loop are currently on-hook. When a dial tone is not present, the computing device 110 can determine if a conversation or data transference is taking place on the open line. A conversation can be determined based upon the conveyance of intermittent signals that are characteristic of speech. A data transference can be determined based upon the conveyance of signals that are characteristic of data. For purposes of determining whether the line is in use, silence and the audible tone 102 indicating an off-hook event can be treated in the same fashion. If no conversation or data transference is detected on the line after a previously defined time-out period, the computing device 110 can determine that an off-hook event has occurred.

Once an off-hook event has been detected, the computing device 110 can initiate a notification event to inform a dwelling habitant or other designated individual of the off-hook event. A variety of notification events can be used to reveal the off-hook event. In one embodiment, at least one speaker 115 can be communicatively linked to the computing device 110 through which an audible message can be played. The audible message can include a characteristic tone, a tune, and/or a speech message. When a speech message is used, the speech can consist of a previously recorded notification message as well as synthetically generated speech.

In another embodiment, the computing device 110 can be communicatively linked to a computing device 120 via the Internet 145 or other computing network. It should be noted that the communication connection to the computing device 120 can be different from the PSTN 140 link shared with the telephone device 105. For example, the Internet communication connection can be a second telephone line, a cable modem, a wireless connection, and the like. Additionally, the Internet communication connection can be a digital subscriber line (DSL), which utilizes the same physical phone line, but uses a different frequency range within the phone line than the voice channel. An electronic document can be sent from the computing device 110 to the computing device 120 to inform the user of the computing device 120 of the off-hook event. The electronic document can include, but is not limited to, an e-mail, a fax, an instant message, a Voice Over Internet Protocol (VOIP) speech message, and the like.

In yet another embodiment, the computing device 110 can be communicatively linked to a mobile device 130 or a different computing device via a wireless network 150 so that a notification message can be conveyed to the mobile device 130. The connection between the wireless network 150 and the computing device 110 can utilize a different communication connection from that which is shared with the telephone device 105. The wireless network 150 can include, a satellite network (for satellite Internet/telephone communications), a radio frequency network (like Wi-Fi), a mobile wireless network (like a cellular network or Personal Communication Services (PCS) network), and any other wireless communication network. The mobile device 130 can include a mobile telephone, a notebook computer, a personal data assistant, a pager, a portable email device, an electronic book, and the like.

In a particular embodiment, the wireless communication link between the computing device 110 and the mobile device 130 can involve the utilization of an intermediate device 125. For example, the intermediate device 125 can be a wireless access point. The intermediate device 125 can also be a local telephony switch linked to the wireless network 150. In yet another example, the intermediate device 125 can be a mobile telephony device linked to the computing device 110, which the computing device 110 can use to access the wireless network 150. When the mobile device 130 is a telephone device, the computing device 110 can utilize a second phone line, which is different from the line shared with the telephone device 105, to contact the mobile device 130.

Figure 2:
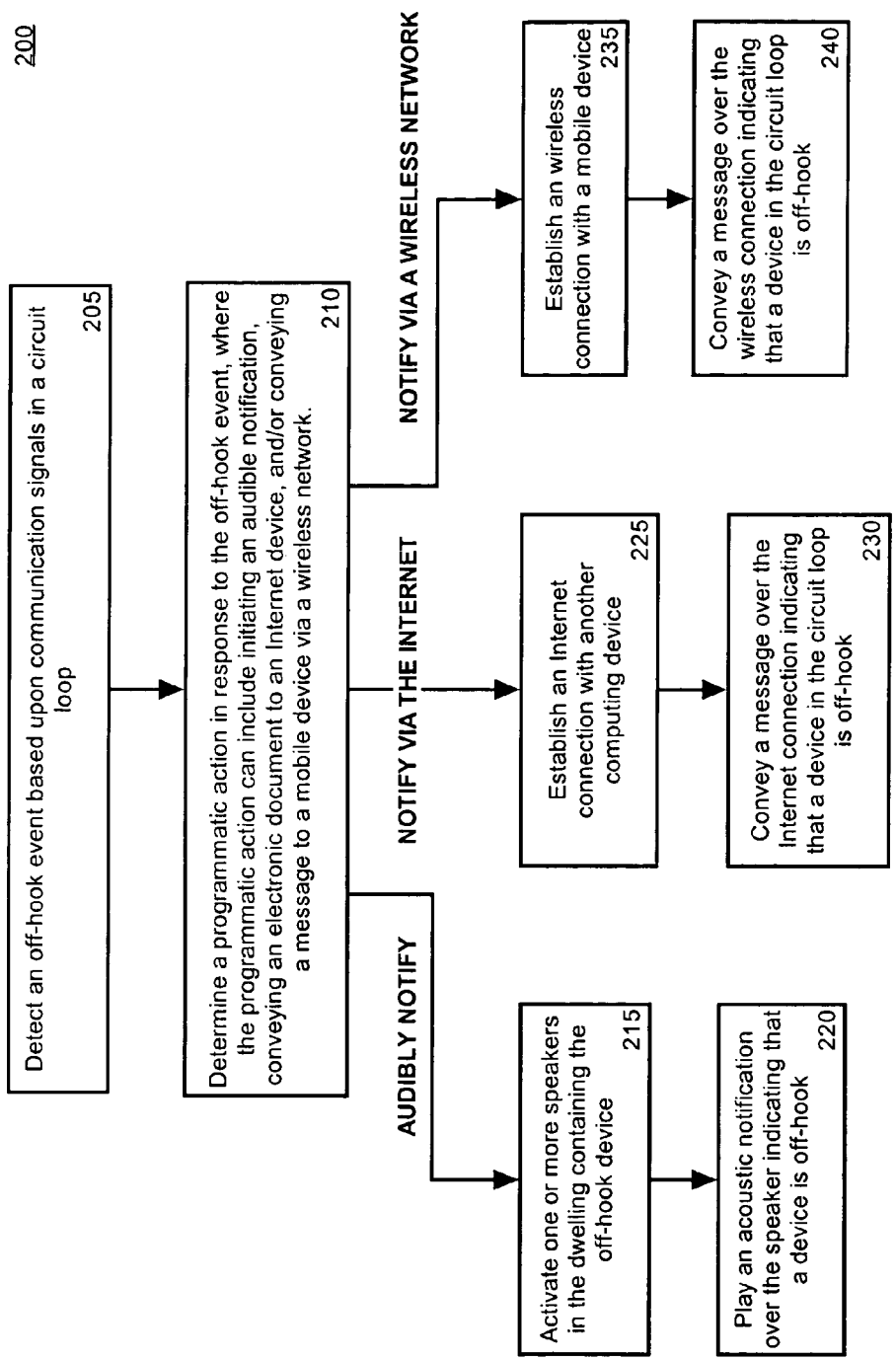
FIG. 2 is a flow chart illustrating a method for detecting off-hook events and notifying a telephone owner of the same in accordance with the inventive arrangements disclosed herein.

FIG. 2 is a flow chart 200 illustrating a method for detecting off-hook events and notifying a telephone owner of the same in accordance with the inventive arrangements disclosed herein. The method 200 can be performed in the context of a circuit loop including at least one telephone device and at least one computing device connected to the circuit loop via a modem. The method can begin in step 205, where an off-hook event can be detected based upon communication signals in the circuit loop. In step 210, one or more programmatic actions can be taken in response to the off-hook event. The programmatic actions can include, but are not limited to, initiating an audible notification, conveying an electronic document to an Internet device, and/or conveying a message to a mobile device via a wireless network.

When a programmatic action of step 210 includes an audible notification, the method can proceed to step 215. In step 215, one or more speakers in the dwelling containing the off-hook device can be activated. In step 220, an acoustic notification can be played over the speakers to indicate that the telephone device is off-hook. The acoustic notification can include speech, a tone, and/or a tune.

When a programmatic action of step 210 includes the conveyance of a notification via the Internet, the method can proceed to step 225. In step 225, the computing device containing the modem can establish an Internet connection with another computing device. In one embodiment, the Internet connection can be connectionless such that a message can be sent to a destination without connection confirmation being transmitted to an originating location. E-mail sent without confirmation can be an example of a connectionless communication. In another embodiment, the Internet connection can involve two-way communication between the originating and destination locations. Instant messaging can be an example of a two-way communication. In step 230, a message can be conveyed to the designated destination location indicating that the telephone device is off-hook. The message can take the form of a fax, an email, an instant message, and the like.

When a programmatic action of step 210 includes the conveyance of a notification via a wireless network, the method can proceed to step 235, where a wireless connection can be established with a mobile device. In step 230, a message can be conveyed over the wireless connection. For example, a speech message can be conveyed to a cellular telephone user indicating that the telephone in the dwelling is off-hook.

Figure 3:
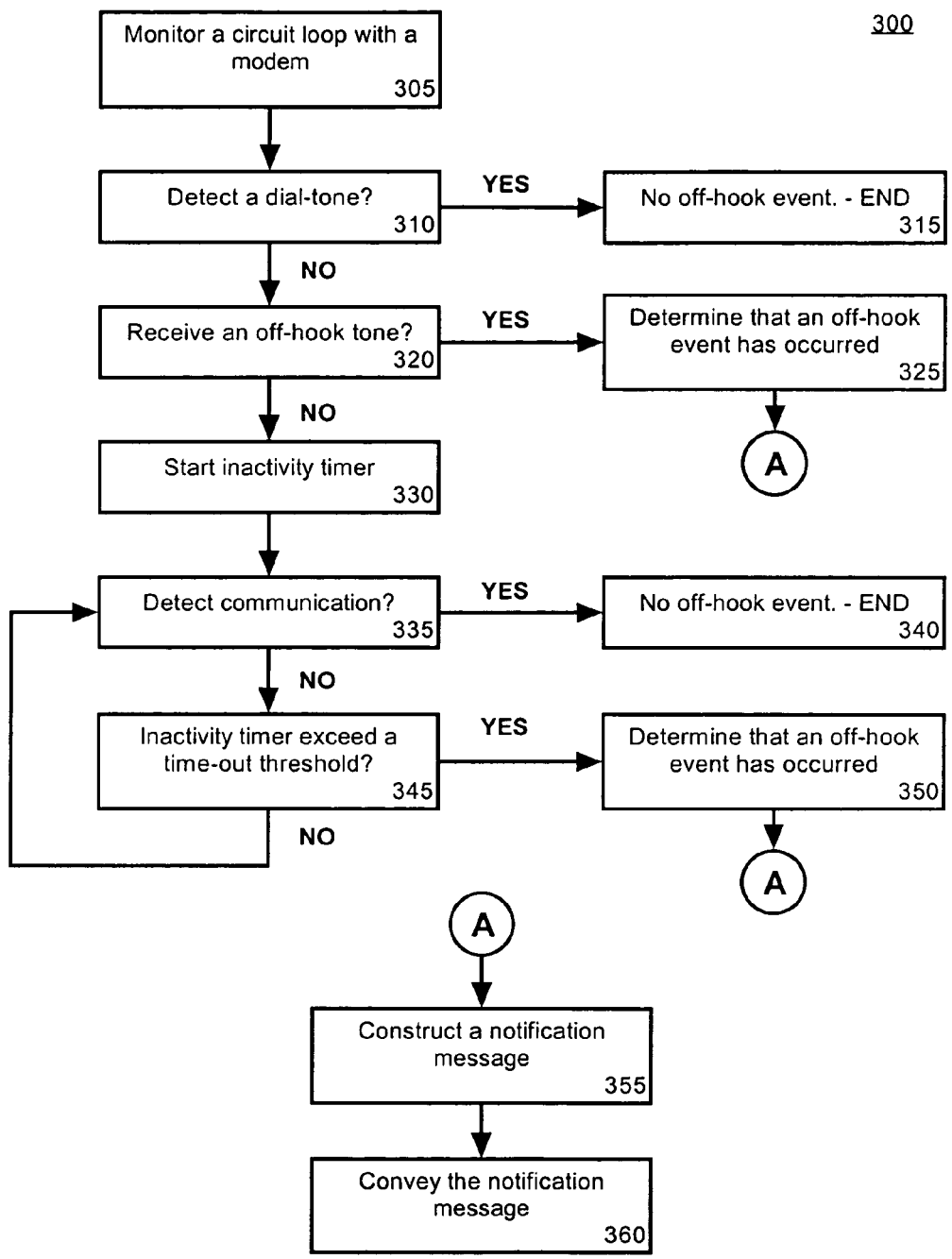
FIG. 3 is another flow chart illustrating a method for detecting off-hook events and notifying a telephone owner of the same in accordance with the inventive arrangements disclosed herein.

FIG. 3 is flow chart illustrating a method 300 for detecting off-hook events and notifying a telephone owner of the same in accordance with the inventive arrangements disclosed herein. The method 300 can be performed in the context of a telephone circuit loop, where the circuit loop has one or more telephone devices connected to the loop as well as at least one computing device connected the loop via a modem. The method can begin in step 305, where the circuit loop can be monitored using the modem. In step 310, the computing device containing the modem can check the circuit loop for a dial tone. If a dial tone is discovered, the method can proceed to step 315, where a determination is made that no off-hook event has occurred and the method can end and/or loop back to step 305.

If no dial tone is discovered in step 310, the method can proceed to step 320, where the circuit loop can be examined for an off-hook tone. If signal specifying such a tone is found, step 325 can begin. Step 325 determines that an off-hook event has occurred and directs the method to proceed to step 355. In an off-hook tone is not discovered, the method can proceed to step 330, where an inactivity timer can be started. In step 335, the circuit loop can be examined for a communication, such as a speech communication or a data transfer communication. If a communication is detected, the method can proceed to step 340, where the method can end because no off hook event is present. Additionally, the method can loop back to step 305, where the circuit loop can be monitored.

If no communication is detected in step 335, the method can proceed to step 345, where the inactivity timer can be compared against a previously established time out threshold. If the threshold is not exceeded, the method can loop back to step 335, where the method can detect the circuit loop for communication activity. If in step 345, the threshold is exceeded by the inactivity timer, the method can proceed to step 350, where a determination that an off-hook event has occurred can be made. The method can then proceed to step 355.

In step 355, a notification message can be constructed. In step 360, the notification message can be conveyed to an appropriate destination, such as those destinations detailed in method 200.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for handling an off-hook event comprising the steps of:

detecting an off-hook event with a modem communicatively linked to a circuit loop in which the off-hock event occurs, wherein said detection is based upon detecting at least one of voice activity and data activity within the circuit loop, and wherein said modem is automatically activated when a telephone device connected to the circuit loop is in an off-hook state and is automatically deactivated when no telephone device connected to the circuit loop is in an off-hook state;

initiating at least one programmatic action within a computing device communicatively linked to said modem, wherein said at least one programmatic action is initiated in response to detection of an off-hook event; and conveying an off-hook notification as a result of said programmatic action.

2. The method of claim 1, said detecting step further comprising the step of:

receiving an information tone, wherein said information tone is generated by a central telephony office to indicate that an off-hook event has occurred.

3. The method of claim 1, said detecting step further comprises the steps of:

determining whether a dial-tone is present;

checking said circuit loop for said audible information; and based upon said checking step and upon a previously established time-out threshold, determining that said off-hook event has occurred.

4. The method of claim 1, where said off-hook notification includes a speech message, said method further comprising the step of:

identifying a previously recorded speech message stored within said computing device.

5. The method of claim 1, where said off-hook notification includes a speech message, said method further comprising the steps of:

identifying a text based notification; and text-to-speech converting said text-based notification to generate said speech message.

6. The method of claim 1, said conveying step further comprising the step of playing an audible message using at least one speaker connected to said computing device.

7. The method of claim 1, wherein said initiating step further comprises the step of establishing a network connection with another computing device such that said conveying step includes sending an electronic message across said network connection.

8. The method of claim 7, wherein said network connection is not part of said circuit loop.

9. The method of claim 1, wherein said initiating step further comprises the step of establishing a wireless connection with a mobile device such that said off-hook notification includes an electronic message conveyed across said wireless connection.

10. The method of claim 9, wherein said mobile device is a mobile telephone and said electronic message includes a speech message.

11. A machine-readable storage having stored thereon, a computer program having a plurality of code sections, said code sections executable by a machine for causing the machine to perform the steps of:
   detecting an off-hook event with a modem communicatively linked to a circuit loop in which the off-hook event occurs, wherein said detection is based upon detecting at least one of voice activity and data activity within the circuit loop, and wherein said modem is automatically activated when a telephone device connected to the circuit loop is in an off-hook state and is automatically deactivated when no telephone device connected to the circuit loop is in an off-hook state;
   initiating at least one programmatic action within a computing device communicatively linked to said modem, wherein said at least one programmatic action is initiated in response to detection of an off-hook event; and
   conveying an off-hook notification as a result of said programmatic action.

12. The machine-readable storage of claim 11, said detecting step further comprising the step of:
   receiving an information tone, wherein said information tone is generated by a central telephony office to indicate that an off-hook event has occurred.

13. The machine-readable storage of claim 11, said detecting step further comprises the steps of:
   determining whether a dial-tone is present;
   checking said circuit loop for said audible information; and
   based upon said checking step and upon a previously established time-out threshold, determining that said off-hook event has occurred.

14. The machine-readable storage of claim 11, where said off-hook notification includes a speech message, said method further comprising the step of:
   identifying a previously recorded speech message stored within said computing device.

15. The machine-readable storage of claim 11, where said off-hook notification includes a speech message, said method further comprising the steps of:
   identifying a text based notification; and
   text-to-speech converting said text-based notification to generate said speech message.

16. The machine-readable storage of claim 11, said conveying step further comprising the step of playing an audible message using at least one speaker connected to said computing device.

17. The machine-readable storage of claim 11, wherein said initiating step further comprises the step of establishing a network connection with another computing device such that said conveying step includes sending an electronic message across said network connection.

18. The machine-readable storage of claim 17, wherein said network connection is not part of said circuit loop.

19. The machine-readable storage of claim 11, wherein said initiating step further comprises the step of establishing a wireless connection with a mobile device such that said off-hook notification includes an electronic message conveyed across said wireless connection.

20. The machine-readable storage of claim 19, wherein said mobile device is a mobile telephone and said electronic message includes a speech message.

21. A system for handling an off-hook event comprising:
   means for detecting an off-hook event with a modem communicatively linked to a circuit loop in which the off-hook event occurs, wherein said detection is based upon detecting at least one of voice activity and data activity within the circuit loop, and wherein said modem is automatically activated when a telephone device connected to the circuit loop is in an off-hook state and is automatically deactivated when no telephone device connected to the circuit loop is in an off-hook state;
   means for initiating at least one programmatic action within a computing device communicatively linked to said modem, wherein said at least one programmatic action is initiated in response to detection of an off-hoot event; and
   means for conveying an off-hook notification as a result of said programmatic action.

* * * * *